(12) United States Patent
Kurosawa et al.

(10) Patent No.: US 11,801,547 B2
(45) Date of Patent: Oct. 31, 2023

(54) CONVEYER

(71) Applicants: DENSO CORPORATION, Kariya (JP); TOYOTA JIDOSHA KABUSHIKI KAISHA, Toyota (JP); AISIN AW CO., LTD., Anjo (JP)

(72) Inventors: Takeshi Kurosawa, Kariya (JP); Kazuhiko Fukuda, Kariya (JP); Hiroaki Takeda, Kariya (JP); Ryosuke Maruyama, Kariya (JP); Toshiro Nakamura, Nisshin (JP); Tadashi Fujiyoshi, Anjo (JP); Daisuke Mizushima, Toyota (JP); Hideki Mukaizaka, Anjo (JP)

(73) Assignees: DENSO CORPORATION, Kariya (JP); TOYOTA JIDOSHA KABUSHIKI KAISHA, Toyota (JP); AISIN AW CO., LTD., Anjo (JP)

(*) Notice: Subject to any disclaimer, the term of this patent is extended or adjusted under 35 U.S.C. 154(b) by 515 days.

(21) Appl. No.: 17/117,162

(22) Filed: Dec. 10, 2020

(65) Prior Publication Data

US 2021/0178456 A1    Jun. 17, 2021

(30) Foreign Application Priority Data

Dec. 11, 2019    (JP) ................................ 2019-223976

(51) Int. Cl.
     *B21F 23/00*      (2006.01)
     *B65G 25/02*      (2006.01)
     (Continued)

(52) U.S. Cl.
     CPC ............ *B21F 23/005* (2013.01); *B65G 25/02* (2013.01); *B65G 35/00* (2013.01); *B65G 47/846* (2013.01); *B65G 2201/0217* (2013.01)

(58) Field of Classification Search
CPC ....... B21F 23/005; B65G 25/02; B65G 25/00; B65G 47/846; B65G 47/847; B65G 47/848; B65G 35/00; B65G 2201/0217
See application file for complete search history.

(56) References Cited

U.S. PATENT DOCUMENTS 3,157,071 A * 11/1964 Pachell ................... B21B 39/20
                                                              414/754
3,901,373 A * 8/1975 Rudzinat ................ B65G 29/00
                                                             198/493

(Continued)

FOREIGN PATENT DOCUMENTS

| JP | 2015-043676 A | 3/2015 |
| JP | 2015-089837 A | 5/2015 |
| JP | 2018-046659 A | 3/2018 |

*Primary Examiner* — Mark A Deuble
(74) *Attorney, Agent, or Firm* — Harness, Dickey & Pierce, P.L.C.

(57) ABSTRACT

A conveyer equipped with rotating discs rotatable around axes thereof relative to a mounting base. Each of the rotating discs has grooves in which rectangular wires are receivable. When an upstream and a downstream one of the rotating disc are arranged in a given angular relation to each other, one of the grooves of the upstream rotating disc is aligned with that of the downstream rotating disc to pass the rectangular wire from the upstream rotating disc to the downstream rotating disc. Upon such passing of the rectangular wire, the grooves of the upstream and downstream rotating discs hold or clamp all side surfaces of the rectangular wire, thereby ensuring the stability in retaining the rectangular wire when passed from one to another of the rotating discs, which enables the conveyer to carry the rectangular wires at high speeds.

8 Claims, 12 Drawing Sheets

(51) Int. Cl.
*B65G 47/84* (2006.01)
*B65G 35/00* (2006.01)

(56) References Cited

U.S. PATENT DOCUMENTS

| | | | | |
|---|---|---|---|---|
| 3,957,152 | A * | 5/1976 | Heitmann | A24C 5/322 198/462.1 |
| 4,003,277 | A * | 1/1977 | Oesterling | A24C 5/322 198/450 |
| 4,266,655 | A * | 5/1981 | Payne | A24C 5/322 198/597 |
| 4,434,818 | A * | 3/1984 | Yeh | B21F 45/22 72/191 |
| 4,561,536 | A * | 12/1985 | Weaver | B65G 35/00 198/781.04 |
| 5,062,523 | A * | 11/1991 | Lenz | B65G 35/00 198/463.6 |
| 5,238,353 | A * | 8/1993 | Kollross | A22C 15/007 198/803.14 |
| 9,138,852 | B2 * | 9/2015 | Rattunde | B24B 9/002 |
| 2002/0046924 | A1 * | 4/2002 | Woodham | B65G 25/08 198/463.5 |
| 2015/0052736 | A1 | 2/2015 | Hayashi et al. | |
| 2018/0076698 | A1 | 3/2018 | Ueno et al. | |
| 2018/0131260 | A1 | 5/2018 | Hayashi et al. | |

* cited by examiner

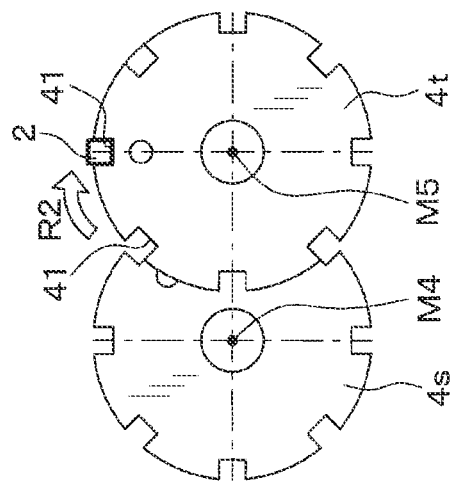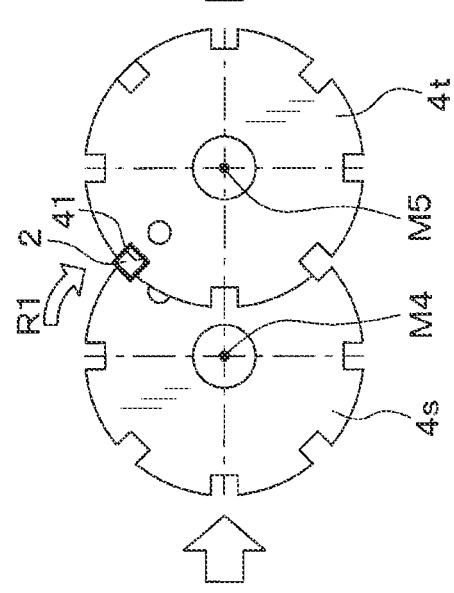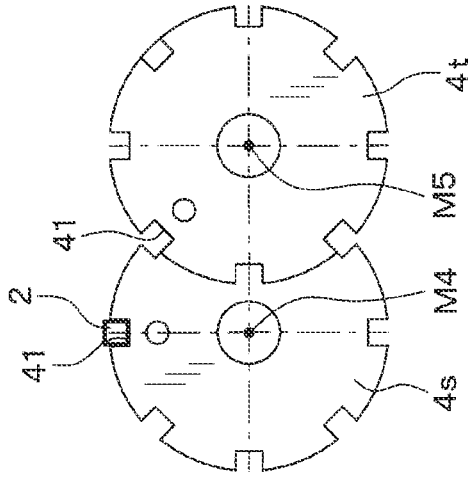

CONVEYER

CROSS REFERENCE TO RELATED DOCUMENT

The present application claims the benefit of priority of Japanese Patent Application No. 2019-223976 filed on Dec. 11, 2019, the disclosure of which is incorporated herein by reference.

BACKGROUND

1 Technical Field

This disclosure relates generally to a conveyer designed to convey flat or rectangular wires.

2 Background Art

Conveyers are known which carry rectangular wires for use in, for example, coils of electrical rotating machines.

Japanese Patent First Publication No. 2015-89837 discloses a conveyer equipped with stationary plates arranged parallel to each other and carrier plates arranged parallel to each other. Each of the stationary plates arid the carrier plates has a plurality of grooves arranged adjacent each other in a conveying direction of the rectangular wires. Each of the grooves of the stationary plates is shaped to bear side surfaces of the rectangular wire which face in different angular directions around a length or axis of the rectangular wire. All the grooves of the carrier plates are of a V-shape. The carrier plates serve to lift up the rectangular wire received in first ones of the grooves of the stationary plates, turn the lifted rectangular wire around the axis thereof, and then carry it to following second ones of the grooves of the stationary plates which are located downstream of the first grooves in the conveying direction. In this way, the conveyer works to carry each of the rectangular wires and bear the side surfaces of the rectangular wire which are turned around the axis of the rectangular wire, thereby facilitating machining all the side surfaces of the rectangular wire from the same direction.

The above conveyer, however, has a risk that when carried at a high speed, the rectangular wire may spring back when lifted up by the carrier plates from the grooves of the stationary plates and be accidentally dropped from the grooves of the carrier plates. Such a failure in carrying the rectangular wires leads to a difficulty in machining the side surfaces of the rectangular wires.

SUMMARY

It is, therefore, an object of this disclosure to provide a conveyer which is capable of carrying a rectangular wire at a high speed and bearing portions of a rectangular wire which are turned around an axis thereof while being carried.

According to one aspect of this disclosure, there is provided a conveyer which conveys rectangular wires and comprises a mounting base, a plurality of rotating discs, and a drive unit. Each of the rotating discs is rotatable about a rotating axis thereof relative to the mounting base. Each of the rotating discs has formed in an outer periphery thereof grooves in which each of the rectangular wires is receivable. The drive unit works to rotate each of the rotating discs about the rotating axis. The rotating discs includes a preceding upstream rotating disc and a following downstream rotating disc which are arranged to partially overlap each other in an axial direction thereof. The preceding upstream rotating disc and the following downstream rotating disc are arranged to have a supplying groove that is one of the grooves of the preceding upstream rotating disc overlap with a receiving groove that is one of the grooves of the following downstream rotating disc in the axial direction to pass the rectangular wire from the supplying groove of the preceding upstream rotating disc to the receiving groove of the following downstream rotating disc when the preceding upstream rotating disc and the following downstream rotating disc are located at a given angular position relative to each other. When the rectangular wire is passed from the supplying groove of the preceding upstream rotating disc to the receiving groove of the following downstream rotating disc, the rectangular wire has four side surfaces retained in total by a combination of the supplying groove of the preceding upstream rotating disc and the receiving groove of the following downstream rotating disc.

The above arrangements enable a surface of each of the rectangular wires which faces away from the rotating axis of the rotating disc to be turned when the rectangular wire is passed from the supplying groove of the preceding upstream rotating disc to the receiving groove of the following downstream rotating disc. The conveyer is, therefore, capable of receiving or hearing portions of each of the rectangular wires which face in different angular directions using the grooves during carrying of the rectangular wires.

When the rectangular wire is passed from the preceding upstream rotating disc to the following downstream rotating disc in the conveyer, the groove of the preceding upstream rotating disc and the groove of the following downstream rotating disc bear all side surfaces of the rectangular wire, thereby minimizing a risk that the rectangular wire may be accidentally dropped from the grooves of the rotating discs. This ensures the stability in carrying the rectangular wires in the conveyer at a high speed. The conveyer is, therefore, capable of delivering the rectangular wires and machining the surfaces of the rectangular wires at a high speed.

BRIEF DESCRIPTION OF THE DRAWINGS

The present invention will be understood more fully from the detailed description given hereinbelow and from the accompanying drawings of the preferred embodiments of the invention, which, however, should not be taken to limit the invention to the specific embodiments but are for the purpose of explanation and understanding only.

In the drawings:

FIGS. 3(A), 3(B), and 3(C) are explanatory views which demonstrate a sequence of operations of a conveyer in the first embodiment;

DESCRIPTION OF THE PREFERRED EMBODIMENTS

Embodiments of the invention will be described below with reference to the drawings. In the following embodiments, same or similar or equivalent parts will be indicated by the same or similar reference numbers, and explanation thereof in detail will be omitted.

First Embodiment

The first embodiment will be described below with reference to FIGS. 1 to 3. The conveyer 1 is designed to carry the rectangular wires 2 used as, for example, coil segments of a rotating electrical machine. Each of the rectangular wires 2 is made of a straight wire whose outer surface is covered with an insulating coating. Each of the rectangular wires 2 is of a substantially rectangular in cross section and has four surfaces around an axis thereof.

Figure 1:
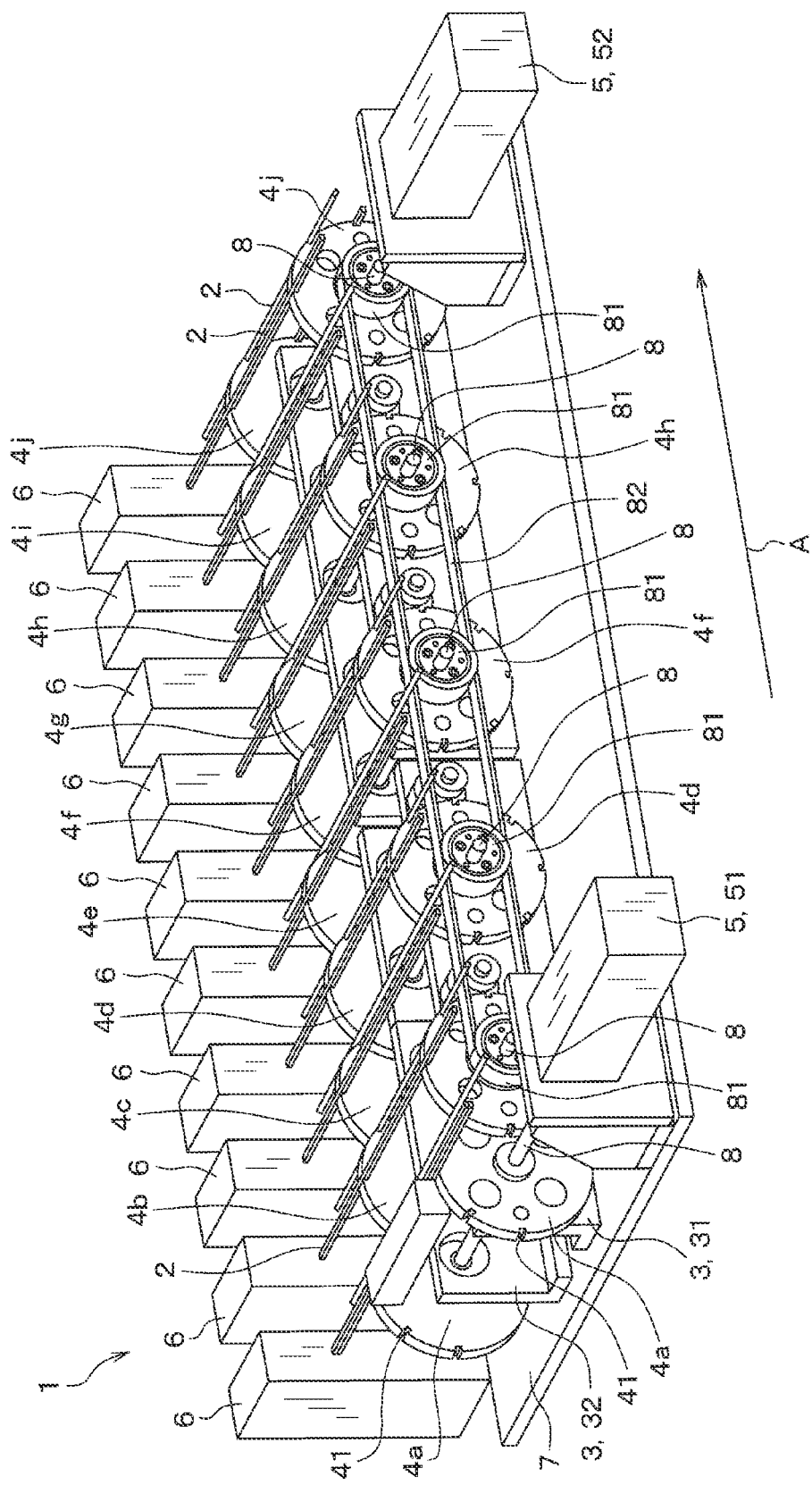
FIG. 1 is a perspective view which illustrates a conveyer according to the first embodiment.
Figure 2:
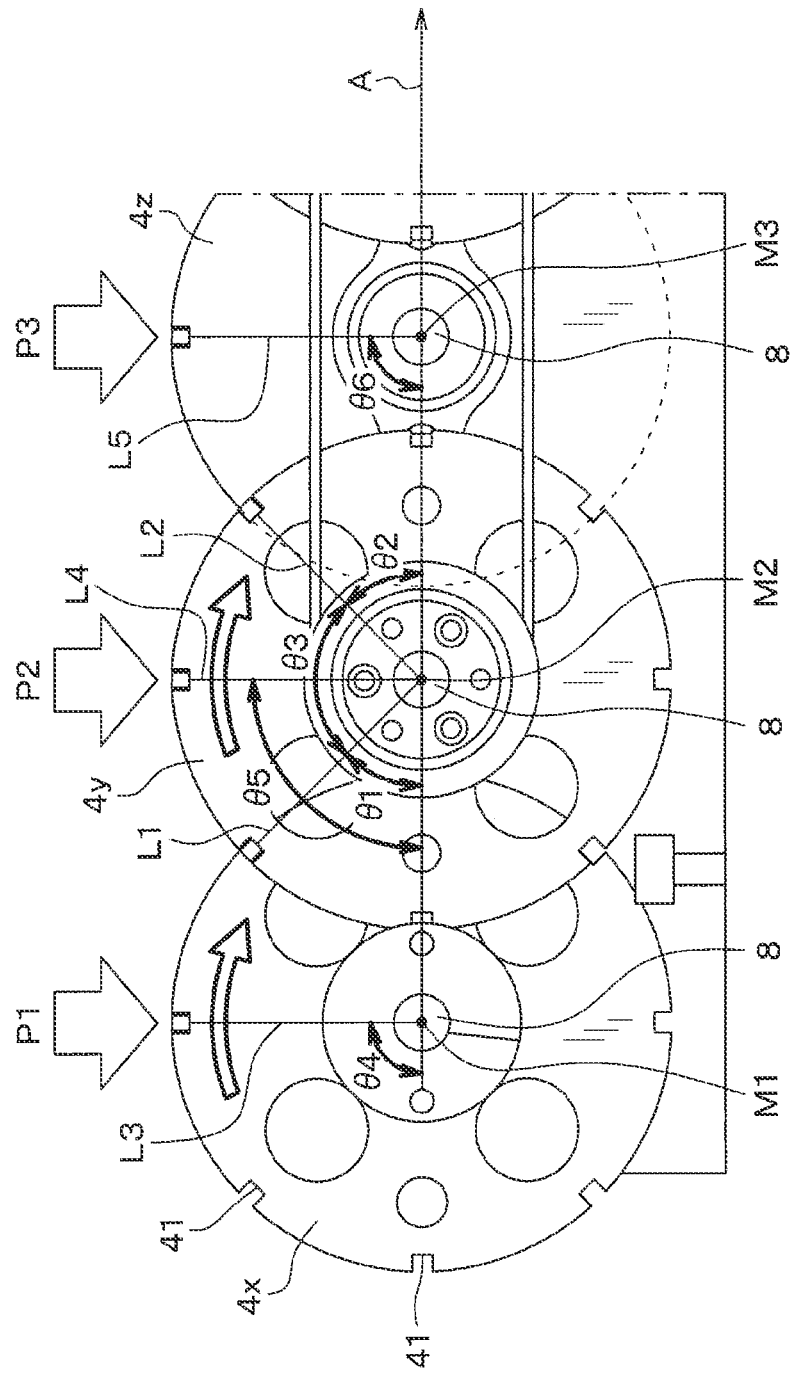
FIG. 2 is a front view which illustrates a region around three rotating discs of a conveyer in the first embodiment.

The conveyer 1, as illustrated in FIGS. 1 and 2, includes the mounting base 3, the rotating discs 4, the drive units 5, and the machining units 6. In the drawings, a conveying direction of the rectangular wires 2 (i.e., a direction in which rotating shafts of the rotating discs 4 are arrayed adjacent each other) is represented by an arrow A. Actually, the rectangular wires 2 are conveyed on a path extending along portions of outer edges of the rotating discs 4.

In FIGS. 1 and 2, the rotating discs 4 and the machining units 6 are identified using numbers with alphabetic affixes. The same applies to the drawings used for describing the following embodiments.

The mounting base 3 is firmly secured to the base 7. The mounting base 3 is made up of an array of two L-shaped plates which extend in the conveying direction of the rectangular wires 2. In the following discussion, for the sake of convenience, one of the plates of the mounting base 3 which is located close to the drive units 5 will also be referred to as the first mounting base 31, while the other plate which is located close to the machining units 6 will also be referred to as the second mounting base 32.

The conveyer 1 includes a plurality of shafts 8 which are arranged to connect the first mounting base 31 and the second mounting base 32 together. The shafts 8 extend substantially perpendicular to the conveying direction of the rectangular wires 2. The shafts 8 are arranged at a given interval away from each other in the conveying direction of the rectangular wires 2. Each of the shafts 8 is supported by the first mounting base 31 and the second mounting base 32 to be rotatable about the axis thereof.

The rotating discs 4 are secured to the shafts 8. Specifically, each of the rotating discs 4 is born by the first mounting base 31 and the second mounting base 32 to be rotatable around the axis thereof (i.e., the shaft 8 on which each of the rotating discs 4 is mounted.

In the following discussion, the rotating discs 4 will also be, as illustrated in FIG. 1, referred to as the first rotating disc 4a, the second rotating disc 4b, the third rotating disc 4c . . . which are arranged in the order from an upstream to a downstream side of a conveying path on which the rectangular wires 2 move in the conveying direction.

Alternatively, a selected three of the rotating discs 4 arranged in the conveying direction of the rectangular wires 2 will also be, as illustrated in FIG. 2, referred to as the upstream rotating disc 4x, the middle rotating disc 4y, and the downstream rotating disc 4z in the order from the upstream to the downstream side of the conveying path for the rectangular wires 2.

Selected two of the rotating discs 4 arranged in the conveying direction of the rectangular wires 2 may alternatively be, as illustrated in FIGS. 4(A) to 3(C), referred to as the preceding upstream rotating disc 4s and the following downstream rotating disc 4t which is located adjacent and downstream of the preceding upstream rotating disc 4s along the conveying path for the rectangular wires 2.

FIG. 1 demonstrate the first rotating disc 4a to the tenth rotating disc 4j. Each of the first rotating disc 4a to the tenth rotating disc 4j may be designed to include two or more of the rotating discs 4 which are mounted on one of the shafts 8. In the example of FIG. 1, each of the first rotating disc 4a, the second rotating disc 4b, the fourth rotating disc 4d, the sixth rotating disc 4f, the eighth rotating disc 4h, and the tenth rotating disc 4j is made up of two of the rotating discs 4 secured to one of the shafts 8. Although not clearly illustrated in FIG. 1, the third rotating disc 4c, the fifth rotating disc 4e, the seventh rotating disc 4g, and the ninth rotating disc 4i may also be made up of two or more of the rotating discs 4 which are mounted on one of the shafts 8.

The rotating discs 4 are so arranged as to have each of the rotating discs 4 partially overlap a respective one of the rotating discs 4 in the axial direction thereof which is located adjacent in the conveying direction of the rectangular wires 2. In the example illustrated in FIG. 1, the first rotating disc 4a is arranged to have a portion thereof which overlaps a portion of the second rotating disc 4b in the axial direction of the rotating discs 4 (i.e., the lengthwise direction of the shafts 8). The same is true for the other rotating discs 4.

Each of the rotating discs 4 has a plurality of grooves 41 which are formed in an outer periphery or circumference thereof and in which one of the rectangular wires 2 is receivable. In this embodiment, each of the rotating discs 4 has the grooves 41 arranged at an interval of 45° away from each other in the axial direction (i.e., the circumferential direction) of the grooves 41. Each of the rotating discs 4, i,e., the preceding upstream rotating disc 4s and an adjacent one of the rotating discs 4, i.e., the following downstream rotating disc 4t are angularly arranged to have at least one of the grooves 41 of the preceding upstream rotating disc 4s overlap or coincide with one of the grooves 41 of the following downstream rotating disc 4t in the axial direction of the rotating discs 4 when the preceding upstream rotating disc 4s and the following downstream rotating disc 4t are located at a given angular position relative to each other. Therefore, when the preceding upstream rotating disc 4s and the second downstream rotating disc 4s are located at the given angular position, it will cause one of the rectangular wires 2 to be passed from one of the grooves 41 of the preceding upstream rotating disc 4s to one of the grooves 41 of the following downstream rotating disc 4t. The given angular position is, thus, an angle of the rotating discs 4 which is selected to enable the rectangular wire 2 to be conveyed from one of the grooves 41 of the preceding upstream rotating disc 4s to one of the grooves 41 of the following downstream rotating disc 4t.

The above given angular position is, as illustrated in FIG. 2, determined in the following manner.

If a line passing through an angular position (which will also be referred to as an upstream delivery position) where the rectangular wire 2 is passed from one of the grooves 41 of the upstream rotating disc 4x to one of the grooves 41 of the middle rotating disc 4y and the rotating axis M2 of the middle rotating disc 4y is defined as a line L1, an angle θ1 which the line L1 makes with the conveying direction of the rectangular wires 2 is selected to be 45°. If a line passing through an angular position (which will also be referred to as a downstream delivery position) where the rectangular wire 2 is passed from one of the grooves 41 of the middle rotating disc 4y to one of the grooves 41 of the downstream rotating disc 4z and the rotating axis M2 of the middle rotating disc 4y is defined as a line L2, an angle θ2 which the line L2 makes with the conveying direction of the rectangular wires 2 is selected to be 45°.

An angle θ3 through which the middle rotating disc 4y rotates about the axis thereof from the upstream delivery position to the downstream delivery position will, therefore, be 90°. Such rotation through 90° from the upstream delivery position to the downstream delivery position is true for all the rotating discs 4 illustrated in FIG. 1.

The conveyer 1 is, as clearly illustrated in FIG. 1, equipped with the drive units 5 working to rotate the rotating discs 4. The drive units 5 includes the first drive unit 51 and the second drive unit 52. Each of the first drive unit 51 and the second drive unit 52 is implemented by, for example, an electrical motor whose operation is controlled by an electronic control unit, not shown. The first drive unit 51 is arranged to rotate the first rotating disc 4a, the third rotating disc 4c, the fifth rotating disc 4e, the seventh rotating disc 4g, and the ninth rotating disc 4i. The second drive unit 52 is arranged to rotate the second rotating disc 4b, the fourth rotating disc 4d, the sixth rotating disc 4f, the eighth rotating disc 4h, and the tenth rotating disc 4j.

Specifically, the second drive unit 52 is joined to the shaft 8 on which the tenth rotating disc 4j is mounted. The shafts 8 on which the second rotating disc 4b, the fourth rotating disc 4d, the sixth rotating disc 4f, the eighth rotating disc 4h, and the tenth rotating disc 4j have the pulleys 81 secured thereto. The pulleys 81 have the belt 82 wound therearound. In operation of the conveyer 1, when the second drive unit 52 is activated to rotate the shaft 8 to which the tenth rotating disc. 4j is joined, it will cause the second rotating disc 4b, the fourth rotating disc 4d, the sixth rotating disc 4f, the eighth rotating disc 4h, and the tenth rotating disc 4j to rotate synchronously with each other.

The first drive unit 51 is joined to the shaft 8 on which the first rotating disc 4a is mounted. Although not illustrated, the pulleys 81 around which the belt 82 is wound are also joined to the shafts 8 on which the first rotating disc 4a, the third rotating disc 4c, the fifth rotating disc 4e, the seventh rotating disc 4g, and the ninth rotating disc 4i are mounted. When the first drive unit 51 rotates the shaft 8 to which the first rotating disc 4a is joined, it will, therefore, cause the first rotating disc 4a, the third rotating disc 4c, the fifth rotating disc 4e, the seventh rotating disc 4g, and the ninth rotating disc 4i to rotate synchronously with each other.

The conveyer 1 is also equipped with a plurality of machining units 6 working to machine end portions of the rectangular wires 2. The machining units 6 are disposed one for each pair of the rotating discs 4. Each of the machining units 6 is located to face at least one of surfaces of a corresponding one of the rectangular wires 2 and works to, for example, press (e.g., elastically deform), cut, or form (e.g., shape) the rectangular wires 2 or strip coating from the rectangular wires 2. Each of the machining units 6 is located between the upstream delivery position and the downstream delivery position. In the following discussion, a position of the rotating discs 4 where each of the rectangular wires 2 received in the groove 41 is machined by the machining units 6 will also be referred to as a machining position.

FIG. 2 indicates the machining positions for the upstream rotating disc 4x, the middle rotating disc 4y, and the downstream rotating disc 4z using arrows P1, P2, and P3, respectively. In the example illustrated in FIG. 2, an angle θ4 which the line L3 extending between the rotating axis M1 of the upstream rotating disc 4x and the machining position P1 for the upstream rotating disc 4x makes with the conveying direction is set to 90°. Similarly, an angle θ5 which the line L4 extending between the rotating axis M2 of the middle rotating disc 4y and the machining position P2 for the middle rotating disc 4y makes with the conveying direction is set to 90°. An angle θ6 which the line L5 extending between the rotating axis M3 of the downstream rotating disc 4z and the machining position P3 for the downstream rotating disc 4z makes with the conveying direction is also set to 90°. In other words, each of the machining units 6 illustrated in FIG. 1 machines a corresponding one of the rectangular wires 2 at a location where an angle which a line extending through the groove 41 in which the corresponding one of the rectangular wires 2 is received and the rotating axis of a corresponding one of the rotating discs 4 makes with the conveying direction is 90°.

The operation of the above described conveyer 1 will also be discussed below with reference to FIGS. 3(A), 3(B), and 3(C) each of which demonstrates only selected two of the rotating discs 4 arranged adjacent each other in the conveying direction of the rectangular wires 2 for the simplicity of discussion. One of the selected two rotating discs 4 which is located upstream in the conveying direction of the rectangular wires 2 will be referred to as the preceding upstream rotating disc 4s. The other rotating disc 4 located adjacent the preceding upstream rotating disc 4s downstream in the conveying direction will be referred to as the following downstream rotating disc 4t. In the following discussion, a location where the rectangular wire 2 is designated to be passed from the groove 41 of the preceding upstream rotating disc 4s to the groove 41 of the following downstream rotating disc 4t will also be referred to as a delivery position. Specifically, the delivery position is a location where one of the grooves 41 of the preceding upstream rotating disc 4s is aligned with one of the grooves 41 of the following downstream rotating disc 4t in the rotating axial direction of the rotating discs 4 (i.e., a direction in which the axis of the rotating discs 4 extend).

First, when the rectangular wire 2 is required to be carried, the drive unit 5, as demonstrated in FIG. 5(A), moves or locates a target one of the grooves 41 (which will be referred to as a receiving groove) of the following downstream rotating disc 4t which is selected to receive the rectangular wire 2 at the delivery position. One of the grooves 41 of the preceding upstream rotating disc 4s (which will also be referred to as a supplying groove) in which the rectangular wire 2 is now received, in other words, scheduled to be passed to the receiving groove of the following downstream rotating disc 4t is located at the machining position for the preceding upstream rotating disc 4s.

Next, the drive unit 5, as indicated by the arrow R1 in FIG. 3(B), rotates the preceding upstream rotating disc 4s to move one of the grooves 41 of the preceding upstream rotating disc 4s in which the rectangular wire 2 is now stored (i.e., the supplying groove 41) until the supplying groove 41 reaches the delivery position. At this time, the following downstream rotating disc 4t is stopped from rotating. This causes the supplying groove 41 of the preceding upstream rotating disc 4s and the receiving groove 41 of the following downstream rotating disc 4t to be aligned or coincide with each other in the rotating axial direction of the rotating disc 4, so that the rectangular wire 2 is received both in the supplying groove 41 of the preceding upstream rotating disc 4s and in the receiving groove 41 of the following downstream rotating disc 4t. This enables the rectangular wire 2 to be passed from the supplying groove 41 of the preceding upstream rotating disc 4s to the receiving groove 41 of the following downstream rotating disc 4t. Upon the above reception of the rectangular wire 2, the four side surfaces of the rectangular wire 2 are retained in total by a combination of the supplying groove 41 of the preceding upstream rotating disc 4s and the receiving groove 41 of the following downstream rotating disc 4t. However, one of the side surfaces of the rectangular wire 2 which is placed in contact with or facing the bottom of the supplying groove 41 of the preceding upstream rotating disc 4s is different from one of the side surfaces of the rectangular wire 2 which faces the bottom of the receiving groove 41 of the following downstream rotating disc 4t. In other words, one of the side surfaces of the rectangular wire 2 which faces away from the rotating axis M4 is different from one of the side surfaces of the rectangular wire 2 which faces away from the rotating axis M5 of the following downstream rotating disc 4t.

Afterwards, the drive unit 5, as indicated by the arrow R2 in FIG. 3(C), rotates the following downstream rotating disc 4t, while the preceding upstream rotating disc 4s is stopped from rotating. The receiving groove 41 of the following downstream rotating disc 4t in which the rectangular wire 2 has been received is moved to the machining position for the following downstream rotating disc 4t. When reaching the machining position for the following downstream rotating disc 4t, the rectangular wire 2 will have one of the side surfaces thereof which makes an angle of 90° with, in other words, adjacent that arranged at the machining position for the preceding upstream rotating disc 4s around the axis of the rectangular wire 2 and which faces away from the rotating axis M5 of the following downstream rotating disc 4t.

The conveyer 1 in the above described first embodiment offers the following beneficial advantages.

1) When conveying the rectangular wire 2 from one of the grooves 41 of the preceding upstream rotating disc 4s to one of the grooves 41 of the following downstream rotating disc 4t, the conveyer 1 changes the surface of the rectangular wire 2 which faces away from the rotating axis of the rotating disc 4. In other words, during carrying of each of the rectangular wires 2 in the conveyer 1, the respective grooves 41 of the rotating discs 4 support different portions (i.e., the different side surfaces) of the rectangular wire 4.

At a time when the rectangular wire 2 is passed from the preceding upstream rotating disc 4s to the following downstream rotating disc 4t, the groove 41 of the preceding upstream rotating disc 4s and the groove 41 of the following downstream rotating disc 4t bear all the side surfaces (i.e., the four side surfaces) of the rectangular wire 2, thereby minimizing a risk that the rectangular wire 2 may be accidentally dropped from the grooves 41 of the rotating discs 4. This ensures the stability in carrying the rectangular wires 2 in the conveyer 1 at a high speed. The conveyer 1 is, therefore, capable of delivering the rectangular wires 2 and machining the surfaces of the rectangular wires 2 at high speed.

2) The drive units 5 of the conveyer 1 work to operate the preceding upstream rotating disc 4s or the following downstream rotating disc 4t during carrying of the rectangular wires 2 in the following way. First, the drive unit 5 locates one of the grooves 41 (i.e., the receiving groove 41) of the following downstream rotating disc 4t to the delivery position for the rectangular wire 2. Next, the preceding upstream rotating disc 4s is rotated until a corresponding one (i.e., the supplying groove 41) of the preceding upstream rotating disc 4s overlaps or coincides with the receiving groove 41 of the following downstream rotating disc 4t and then stopped. Subsequently, the drive unit 5 starts rotating the following downstream rotating disc 4t. In this way, the conveyer 1 successively passes the rectangular wires 2 from the grooves 41 of the preceding upstream rotating disc 4s to the grooves 41 of the following downstream rotating disc 4t.

3) In this embodiment, the middle rotating disc 4y is scheduled to be rotated through 90° from the upstream delivery position to the downstream delivery position. This enables the conveyer 1 to change or turn the surface of each of the rectangular wires 2 which faces away from the rotating axis of the rotating disc 4 by 90° each time the rectangular wire 2 is passed from an upstream one to a downstream one of the rotating discs 4. This facilitates the ease with which all the side surfaces of each of the rectangular wires 2 is machined by the machining units 6 while the rectangular wires 2 are being carried by the conveyer 1.

Second Embodiment

The second embodiment will be described below which is different only in structure of the grooves 41 of the rotating discs 4 from the first embodiment. Other arrangements are identical, and explanation thereof in detail will be omitted here.

Figure 4:
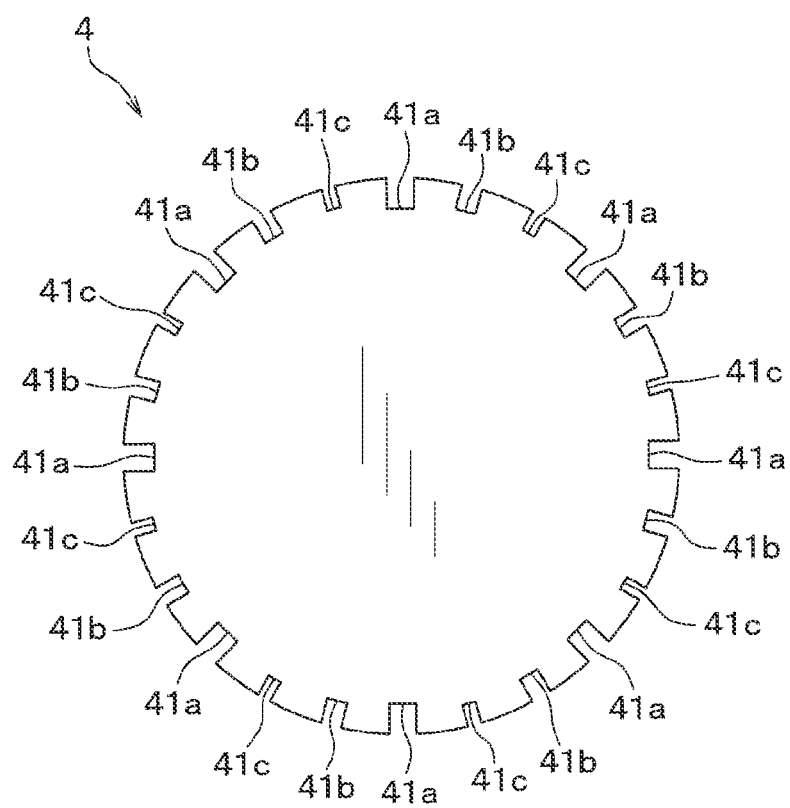
FIG. 4 is a plan view which illustrates a rotating disc installed in a conveyer according to the second embodiment.
Figure 5:
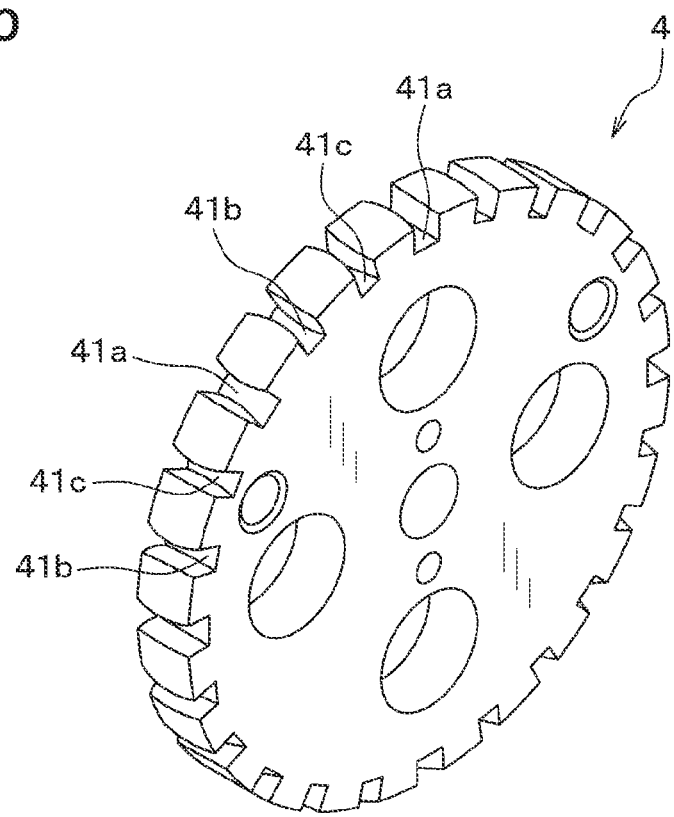
FIG. 5 is a perspective view which illustrates a rotating disc installed in a conveyer according to the second embodiment.

Each of the rotating discs 4 of the conveyer 1 in the second embodiment is, as clearly illustrated in FIGS. 4 and 5, equipped with a plurality of different configurations of the grooves 41. Specifically, the grooves 41 are contoured to conform with configurations of the rectangular wires 2 which are different in shape of cross sections or size from each other. The example demonstrated in FIGS. 4 and 5, each of the rotating discs 4 has three types of grooves 41. In the following discussion, the three types of grooves 41 will also be referred to as the first groove 41a, the second groove 41b, and the third groove 41c. The first grooves 41a are arranged at an angular interval of 45° away from each other in the rotating direction (i.e., the circumferential direction) of the rotating discs 4. Similarly, the second grooves 41b are arranged at an angular interval of 45° away from each other in the rotating direction (i.e., the circumferential direction) of the rotating discs 4. The third grooves 41c are arranged at an angular interval of 45° away from each other in the rotating direction (i.e., the circumferential direction) of the rotating discs 4.

Figure 6:
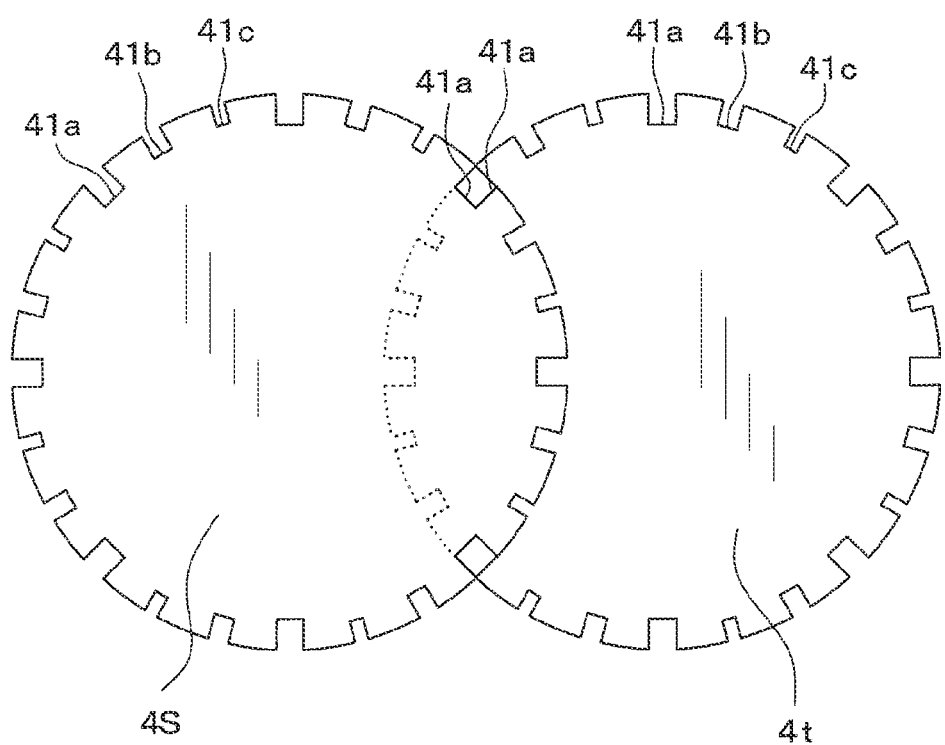
FIG. 6 is a plan view which illustrates layout of two adjacent rotating discs installed in a conveyer in the second embodiment.

Like in the first embodiment, the rotating discs 4 are, as can been seen in FIG. 6, arranged to have a portion of the preceding upstream rotating disc 4s overlap a portion of the following downstream rotating disc 4t in the rotating axial direction. Specifically, when the preceding upstream rotating disc 4s and the following downstream rotating disc 4t are arranged at a predetermined angle (which will also be referred to below as a first angle) away from each other, one of the first grooves 41a of the preceding upstream rotating disc 4s coincides with one of the first grooves 41a of the following downstream rotating disc 4t in the rotating axial direction. This enables the rectangular wire 2 which has a cross section or size physically liftable in the first grooves 41a to be passed from one of the first grooves 41a of the preceding upstream rotating disc 4s to one of the first grooves 41a of the following downstream rotating disc 4t.

Although not illustrated, when the preceding upstream rotating disc 4s and the following downstream rotating disc 4t are arranged at a second angle different from the first angle for the first grooves 41a, one of the second grooves 41b of the preceding upstream rotating disc 4s coincides with one of the second grooves 41b of the following downstream rotating disc 4t in the rotating axial direction. This enables the rectangular wire 2 which has a cross section or size physically receivable in the second grooves 41b to be passed from one of the second grooves 41b of the preceding upstream rotating disc 4s to one of the second grooves 41b of the following downstream rotating disc 4t.

Similarly, when the preceding upstream rotating disc 4s and the following downstream rotating disc 4t are arranged at a third angle different from the first angle and the second angle for the first and second grooves 41a and 41b, one of the third grooves 41c of the preceding upstream rotating disc 4s coincides with one of the third grooves 41c of the following downstream rotating disc 4t in the rotating axial direction. This enables the rectangular wire 2 which has a cross section or size physically receivable in the third grooves 41c to be passed from one of the third grooves 41c of the preceding upstream rotating disc 4s to one of the third grooves 41c of the following downstream rotating disc 4t.

As apparent from the above discussion, the conveyer 1 in the second embodiment is equipped with the rotating discs 4 which have the different types of grooves 41 which are contoured to conform with the rectangular wires 2 which are different in configuration or size thereof from each other. The preceding upstream rotating disc 4s and the following downstream rotating disc 4t are arranged in a given angular relation to each other to have the same type of grooves 41 coincide with each other when the rectangular wire 2 is passed from the preceding upstream rotating disc 4s to the following downstream rotating disc 4t. This enables the conveyer 1 to carry a plurality of different types of rectangular wires 2.

Third Embodiment

The third embodiment will be described below which is a modification of the first embodiment and equipped with a cover member. Other arrangements are identical with those in the first embodiment, and explanation thereof in detail will be omitted here.

Figure 7:
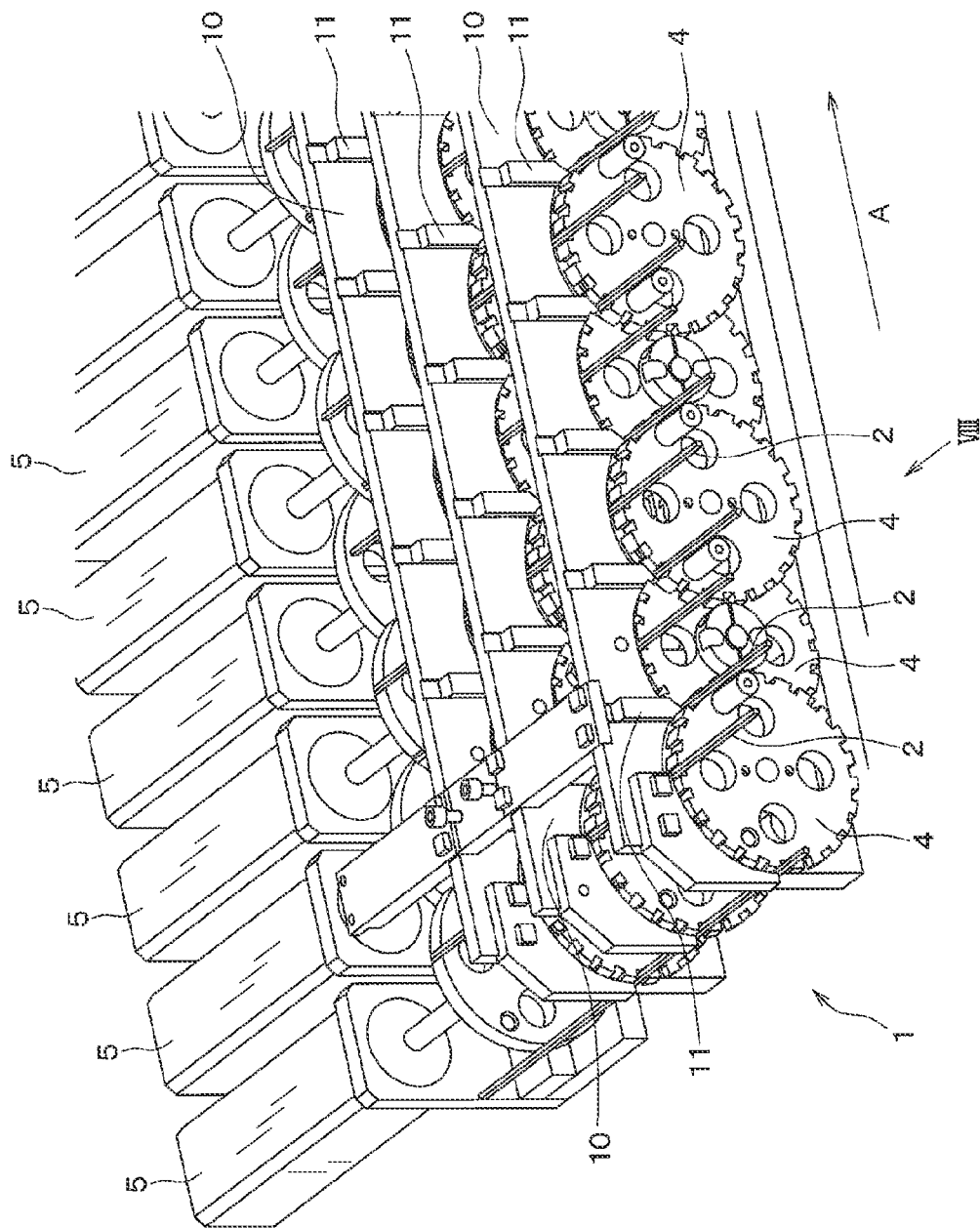
FIG. 7 is a perspective view which illustrates a conveyer according to the third embodiment.
Figure 8:
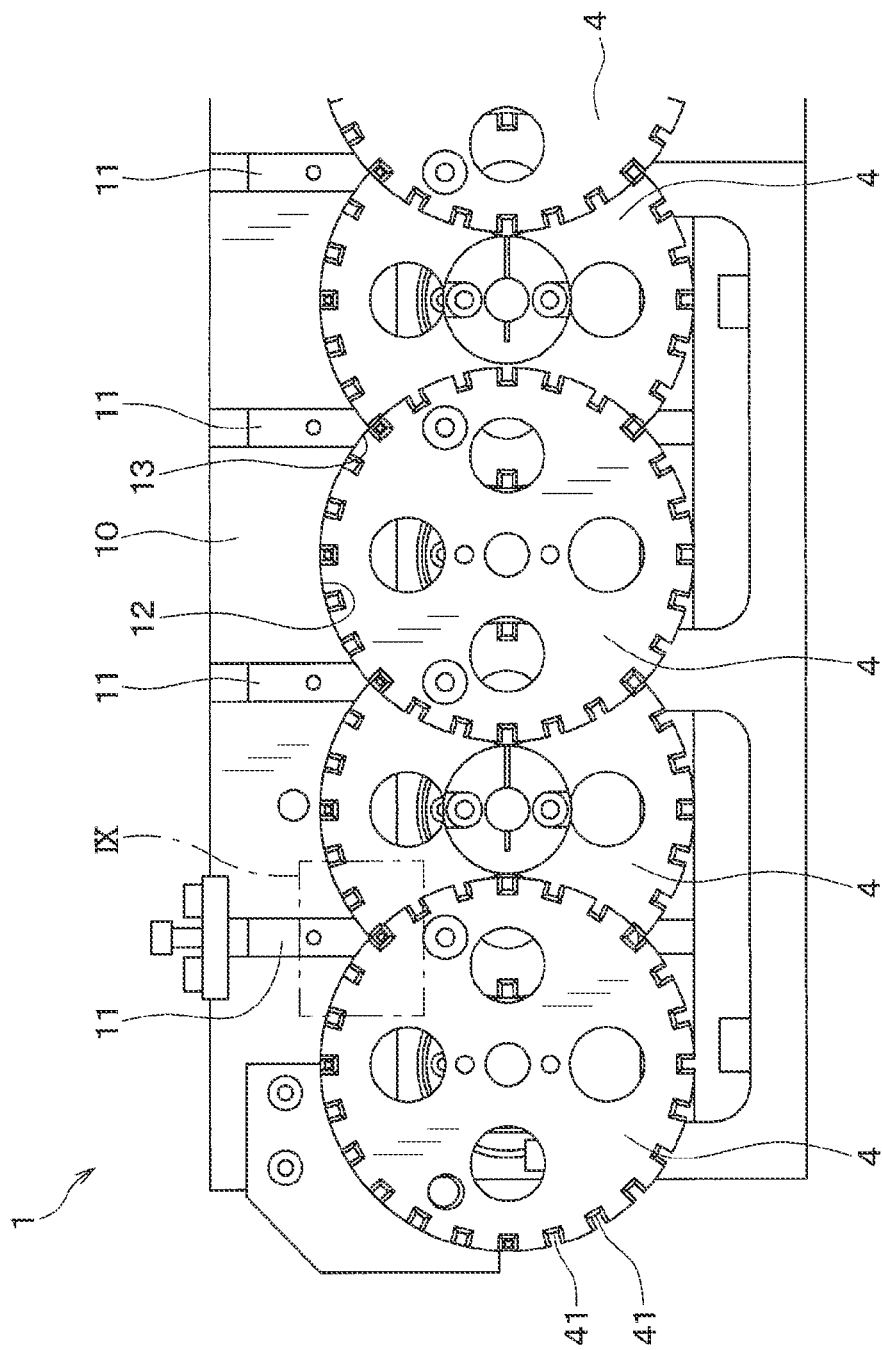
FIG. 8 is a front view which illustrates a portion of the conveyer viewed from a direction, as indicated by an arrow VIII in FIG. 7.

The conveyer 1 in the third embodiment is, as illustrated in FIGS. 7 and 8, equipped with the conveyer covers 10 and the delivering covers 11. The conveyer covers 10 are arranged to cover outer edges of the rotating discs 4, respectively. The conveyer covers 10 have surfaces 12 which face the rotating discs 4 and are contoured to conform with the outer shape of the outer edges (i.e., outer circumferences) of the rotating discs 4. The conveyer covers 10, therefore, serve as a stopper which avoids accidental removal of the rectangular wires 2 from the grooves 41 of the rotating discs 4 by centrifugal force during carrying of the rectangular wires 2.

Each of the delivering covers 11 is, as clearly illustrated in FIG. 8, arranged to cover a place where the rectangular wire 2 is passed from the supplying groove 41 of the preceding upstream rotating disc 4s to the receiving groove 41 of the following downstream rotating disc 4t and around that place. Each of the delivering covers 11 has the surface 13 which is contoured to conform with the outer shapes of the outer edges of the adjacent rotating discs 4. The delivering covers 11 are secured to the conveyer covers 10. Each of the delivering covers 11 is arranged to have an adjustable distance between itself and the rotating discs 4.

Figure 9:
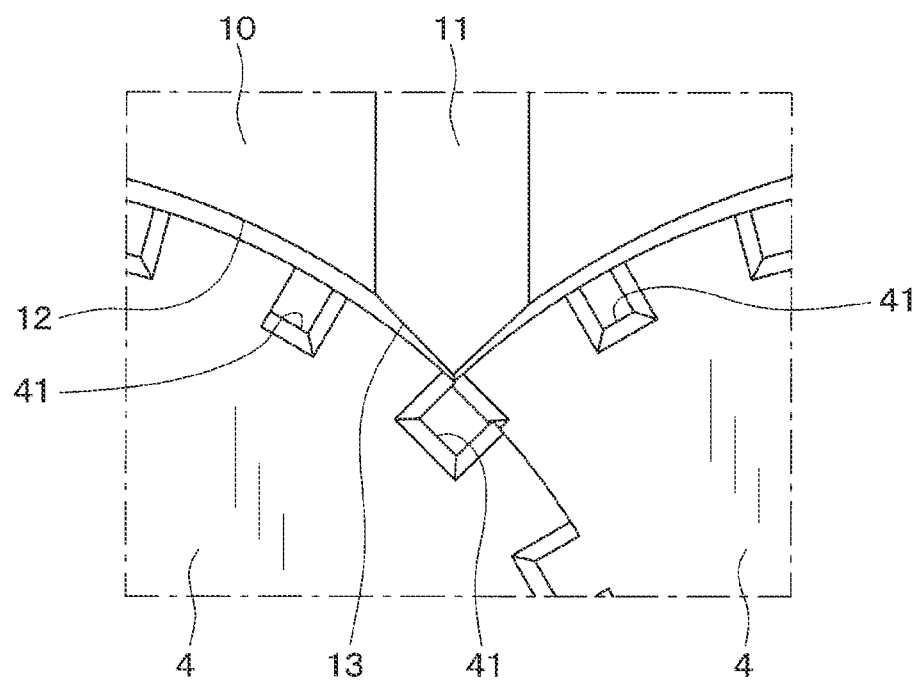
FIG. 9 is an enlarged view of a portion of the conveyer surrounded by a broken line IX in FIG. 8.

The delivering covers 11 are, as can be seen in FIG. 9, located closer to the outer edges of the rotating discs 4 than the conveyer covers 10 are. When the rectangular wires 2 partially protrude from the grooves 41 of the rotating discs 4 during carrying thereof, the delivering covers 11 serve to guide the rectangular wires 2 inside the grooves 41. In other words, when the rectangular wires 2 which partially protrude from the grooves 41 of the rotating discs 4 are being carried toward the delivery positions thereof, they are guided by the delivering covers 11 to correct positions in the grooves 41. The delivering covers 11, therefore, eliminates a risk that the rectangular wire 2 which is carried with a portion thereof protruding from the groove 41 of the preceding upstream rotating disc 4s may collide with an open edge of the groove 41 of the following downstream rotating disc 4t before the delivery position.

The conveyer 1 in the third embodiment is, as apparent from the above discussion, equipped with the conveyer covers 10 and thus capable of avoiding the accidental removal of the rectangular wires 2 from the grooves 41 during carrying thereof. This enables the conveyer 1 to rotate the rotating discs 4 at a high speed to carry the rectangular wires 2 at a high speed.

The conveyer 1 in the third embodiment is also equipped with the delivering covers 11 which cover portions of the rectangular wires 2 to be passed directly from one to another of the grooves 41 of the rotating discs 4 and also cover a region around the passed portions of the rectangular wires 2, thereby ensuring the stability in location of the rectangular wires 2 in the desired positions in the grooves 41 at a time when the rectangular wires 2 are passed from one to another of the rotating discs 4. This eliminates a failure of the conveyer 1 in passing the rectangular wires 2 from the groove 41 of the preceding upstream rotating disc 4s to the groove 41 of the following downstream rotating disc 4t.

The region around the passed portions of the rectangular wires 2 covered by the delivering covers 11, as referred to above, represents a region which ensures that the delivering cover 11 locates the rectangular wire 2, as being conveyed with a portion thereof protruding outside the groove 41 of the rotating disc 4, to the desired position in the groove 41 before the rectangular wire 2 reaches the delivery position.

Fourth Embodiment

The fourth embodiment will be described below which is different from the first embodiment in structure designed for different lengths of the rectangular wires 2. Other arrangements are identical with those in the first embodiment, and explanation thereof in detail will be omitted here.

Figure 10:
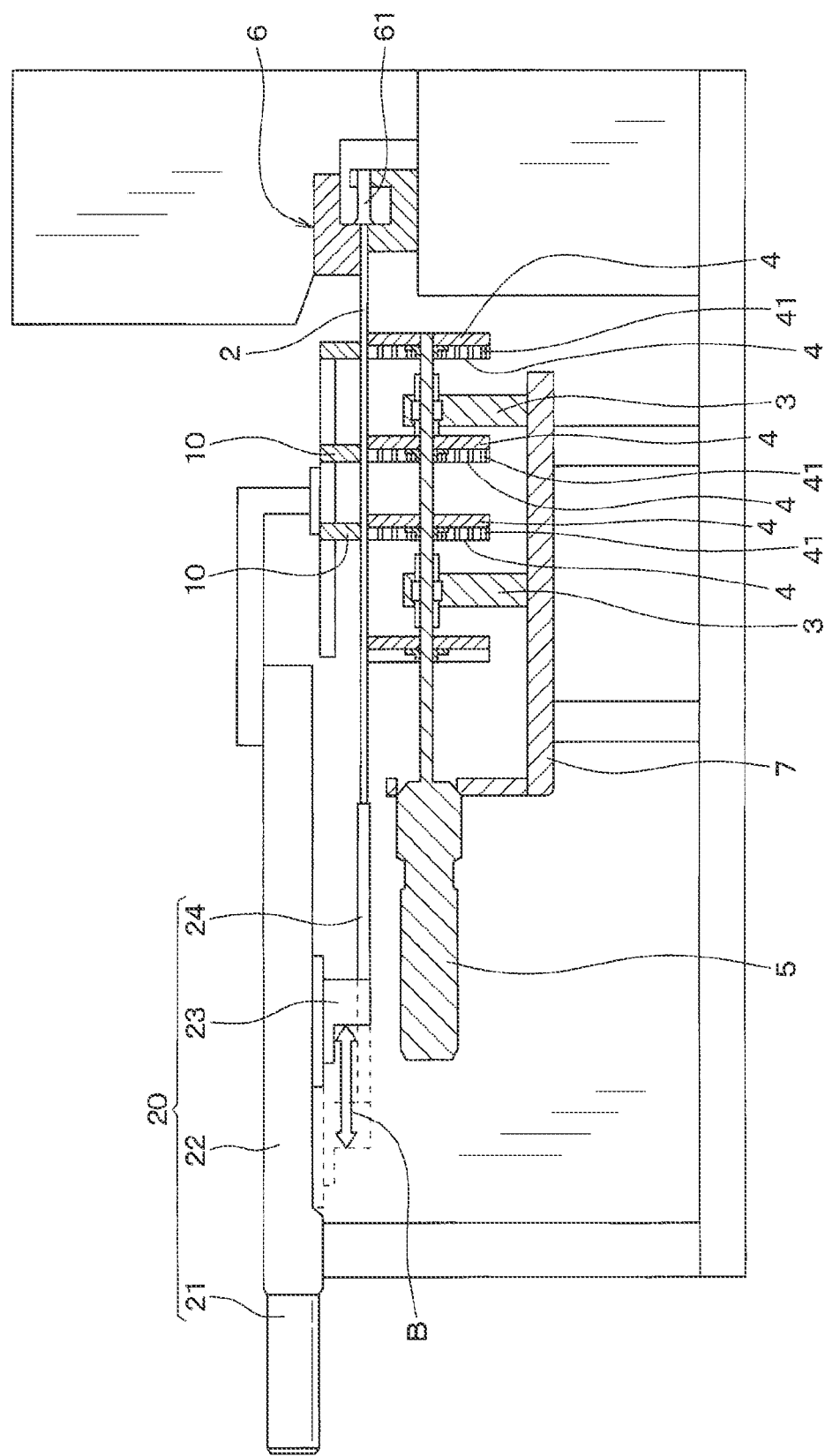
FIG. 10 is a schematic view which illustrates a conveyer according to the fourth embodiment.
Figure 11:
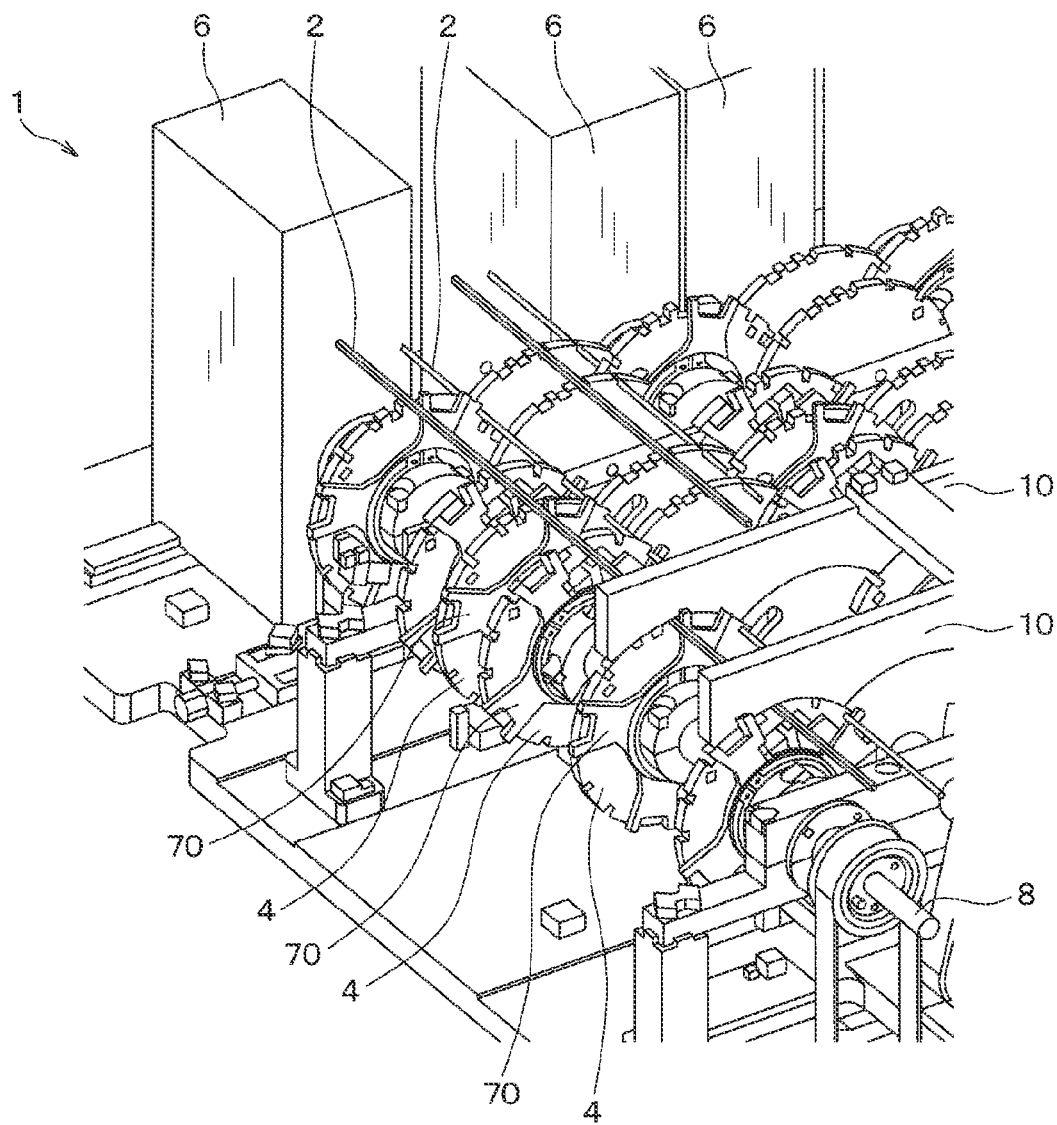
FIG. 11 is a perspective view which illustrates a portion of a conveyer according to the fifth embodiment.

The conveyer 1 in the fourth embodiment is, as illustrated in FIG. 10, equipped with the stopper 61 installed in each of the machining units 6. The stopper 61 is designed to be contactable with an end (which will also be referred to as a first end) of a length of the rectangular wire 2. The first end of each of the rectangular wires 2 contacts one of the stoppers 61, thereby precisely positioning the rectangular wire 2 in a corresponding one of the machining units 6. This achieves accurate machining of the rectangular wires 2 in predetermined positions in the machining units 6.

The conveyer 1 is also equipped with the presses 20 each of which presses a second end of the rectangular wire 2 that is opposed to the first end thereof toward the stopper 61. Each of the presses 20 is equipped with the electrical motor 21, the guide rail 22, the slide block 23, and the pusher 24. The guide rail 22 extends parallel to the length of the rectangular wire 2 carried by the conveyer 1. The slide block 23 is moved by the motor 21 to reciprocate in a direction indicated by an arrow B along the guide rail 22. The pusher 24 is secured to the slide block 23. The pusher 24 is contactable with the second end of the rectangular wire 2 placed at the machining position.

In operation, the conveyer 1 in the fourth embodiment actuates the motor 21 of the press 20 when the rectangular wire 2 received in the groove 41 of the rotating disc 4 reaches the machining position. The motor 21 moves the slide block 23 toward the rectangular wire 2 (i.e., the stopper 61) along the guide rail 22. This causes the pusher 24 secured to the slide block 23 to contact the second end of the rectangular wire 2 farther away from the stopper 61 to thrust or move the rectangular wire 2 toward the stopper 61. The rectangular wire 2 then contacts at the first end thereof with the stopper 61, thereby precisely positioning the rectangular wire 2 in a corresponding one of the machining units 6.

The conveyer 1 in the above described forth embodiment works to press the rectangular wires toward the stoppers 61 using the presses 20 to make contact the first ends of the rectangular wires 2 with the stoppers 61 installed in the machining units 6, thereby ensuring the stability in precisely locating the different lengths of the rectangular wires 2 at the predetermined positions during the carrying of the rectangular wires 2 to achieve accurate machining of the rectangular wires 2 in the machining units 6.

Fifth Embodiment

The fifth embodiment will be described below with reference to FIGS. 11 to 14, and is different from the first embodiment in that the conveyer 1 is equipped with a structure serving to minimize misalignment of the rectangular wires 2 in the axial direction thereof. Other arrangements are identical with those in the first embodiment, and explanation thereof in detail will be omitted here.

Figure 12:
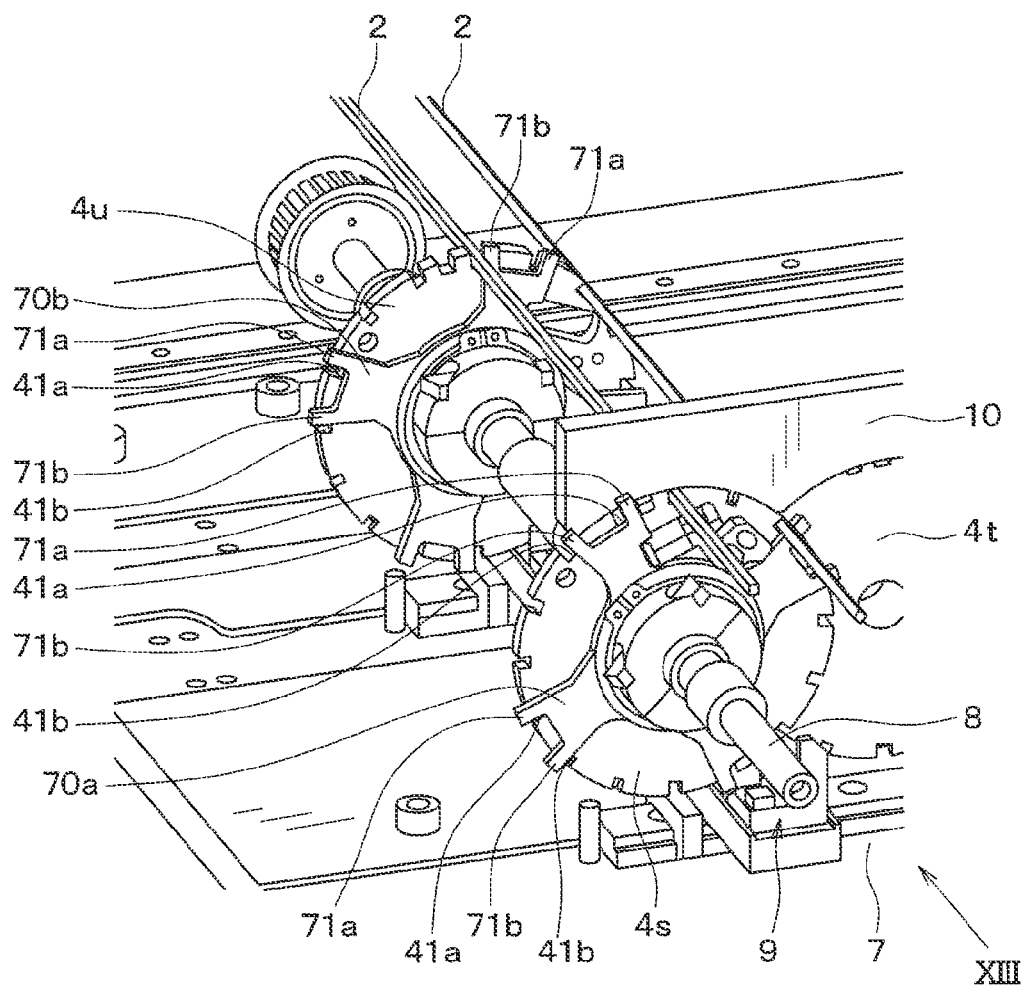
FIG. 12 is a perspective view which illustrates a portion of a conveyer according to the fifth embodiment.
Figure 13:
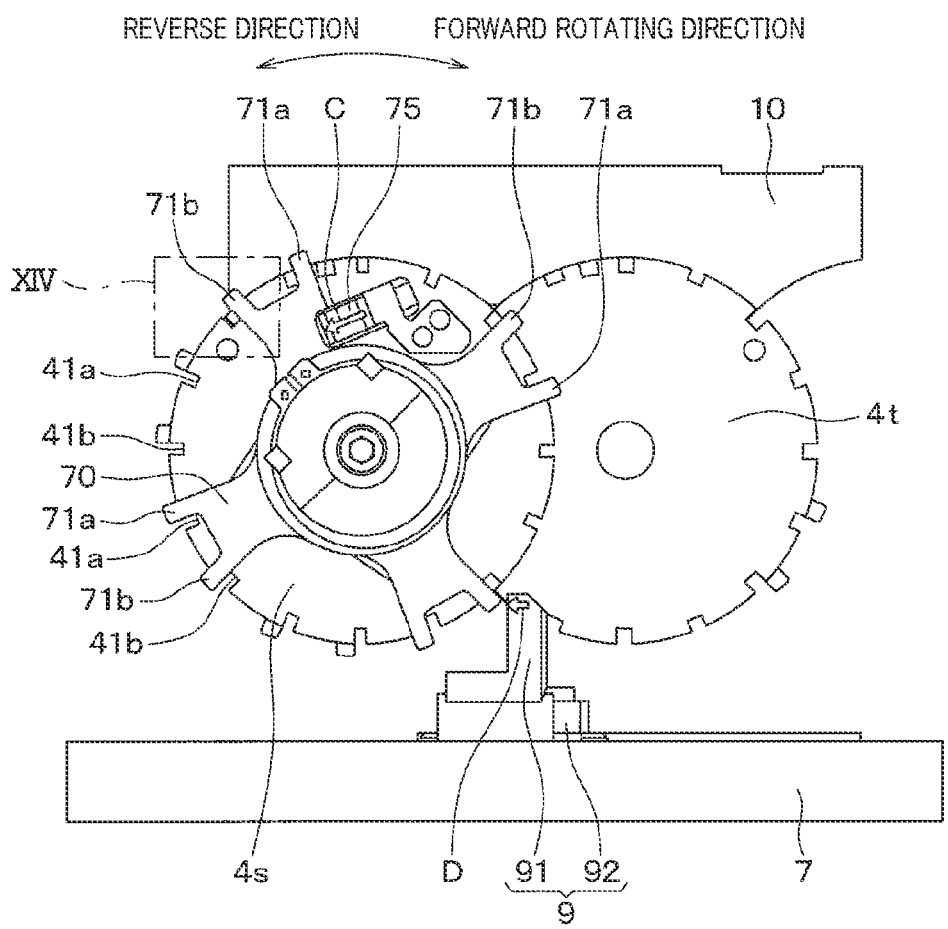
FIG. 13 is a front view which illustrates a portion of the conveyer as viewed from an arrow XIII in FIG. 12.

Each of the rotating discs 4 of the conveyer 1 in the fifth embodiment is, as illustrated in FIGS. 12 and 13, equipped with two types of grooves 41 which are contoured to conform with two types of cross sections or sizes of the rectangular wires 2. In the following discussion, the two types of grooves 41 will also be referred to as the first grooves 41a and the second grooves 41b, respectively. The first grooves 41a are arranged at an interval of 45° away from each other in a direction of rotation of the rotating discs 4. Similarly, the second grooves 41b are arranged at an interval of 45° away from each other in the direction of rotation of the rotating discs 4.

The conveyer 1 in the fifth embodiment is equipped with the clamp lever 70 and the release device 9 for each of the rotating discs 4. Each of the clamp levers 70 is mounted on a respective one of the rotating discs 4 to be rotatable together with the rotating disc 4. Each of the clamp levers 70 is arranged to rotate relative to the rotating disc 4 within a given angular range. The clamp lever 70 is equipped with the pawls 71 for the grooves 41 of the rotating discs 4.

The clamp levers 70, as illustrated in FIG. 12, include the clamp levers 70a and the clamp levers 70b. The clamp lever 70a is mounted on a first one of the preceding upstream rotating discs 4s aligned with each other in the rotating axial direction thereof and equipped with four first pawls 71a for the first grooves 41a and four second pawls 71b for the second grooves 41b. Similarly, the clamp lever 70b is mounted on a second one (which is illustrated as the rotating disc 4u in FIG. 12) of the preceding upstream rotating discs 4s aligned with each other in the rotating axial direction thereof and equipped with the four first pawls 71a for the first grooves 41a and the four second pawls 71b for the second grooves 41b. The clamp lever 70a disposed on the preceding upstream rotating disc 4s is located 45° out of phase with the clamp lever 70b disposed on the rotating disc 4u. The clamp lever 70a of the preceding upstream rotating disc 4s and the clamp lever 70b of the rotating discs 4u are, therefore, equipped with the pawls 71 each for the rectangular wire 2 selectively received in any of the grooves 41 of the rotating disc 4.

Each of the rotating discs 4 is, as illustrated in FIG. 13, equipped with the spring mechanism 75. The spring mechanism 75, as indicated by an arrow C in FIG. 13, works to apply load to the clamp lever 70 at all the time in a direction opposite the direction of rotation of the rotating disc 4.

Figure 14:
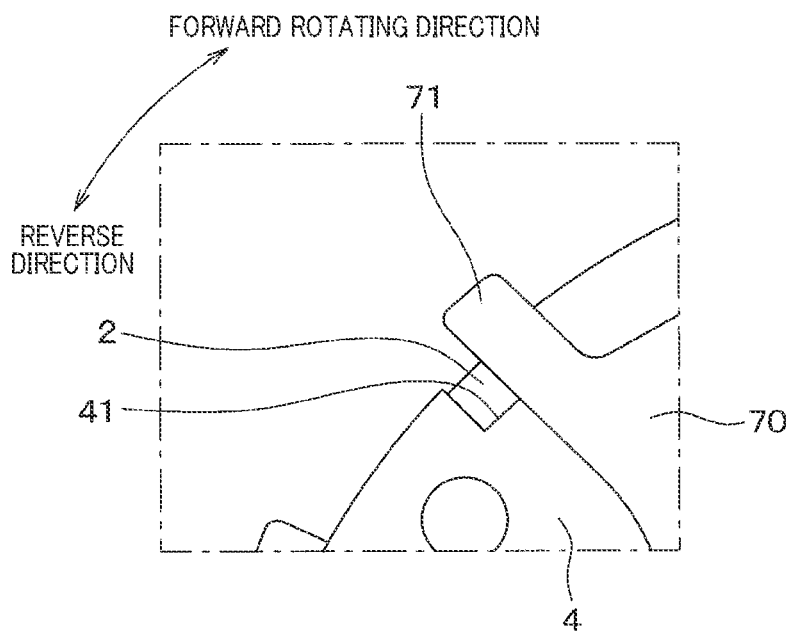
FIG. 14 is an enlarged view which illustrates a portion of the conveyer surrounded by a broken line VIV in FIG. 13.

FIG. 14 demonstrates the spring mechanism 75 applying the load to the clamp lever 70 with the rectangular wire 2 received in the groove 41 of the rotating disc 4. The pawl 71 of the clamp lever 70, as illustrated in FIG. 14, urges or presses the rectangular wire 2 against a surface of an inner wall of the groove 41 which faces in the direction of rotation of the rotating disc 4. This firmly holds or clamps the rectangular wire 2, as received in the groove 41 of the rotating disc 4, between the pawl 71 of the clamp lever 70 and the face of the groove 41 which faces the direction of rotation of the rotating disc 4. This eliminates a risk of positional misalignment of the rectangular wires 2 in the grooves 41 of the rotating discs 4 in the rotating axial direction of the rotating discs 4 during carrying thereof.

The release device 9 is, as clearly illustrated in FIG. 13, mounted on the base 7. The release device 9 is equipped with the unclamping lever 91 and the drive mechanism 92 serving as an actuator to move the unclamping lever 91. The unclamping lever 91 is moved by the drive mechanism 92 in a direction, as indicated by an arrow D in FIG. 13, to thrust the clamp lever 70 in a direction (i.e., the direction of rotation of the rotting disc 4) opposite a direction in which the spring mechanism 75 presses the rectangular wire 2. This causes the clamp lever 70 to release the clamping of the rectangular wire 2.

The release device 9 moves the unclamping lever 91 in the direction D in FIG. 13 when the rectangular wire 2 received in the groove 41 of the rotating disc 4 is located at the delivery position. This releases the clamping of the rectangular wire 2 by the clamp lever 70 when the rectangular wire 2 is passed from the groove 41 of the preceding upstream rotating disc 4s to the groove 41 of the following downstream rotating disc 4t.

The conveyer 1 in the fifth embodiment is, as apparent from the above discussion, capable of firmly clamping each of the rectangular wires 2, as received in the groove 41 of the rotating disc 4, between one of the surfaces of the inner wall of the groove 41 which faces the direction of rotation of the rotating disc 4 and the clamp lever 70, thereby minimizing a risk of an error in position of the rectangular wire 2 in the rotating axial direction during carrying of the rectangular wire 2.

The conveyer 1 in the fifth embodiment works to release the clamping of each of the rectangular wires 2, as achieved by the clamp lever 70, by means of the release device 9 when the rectangular wire 2 is passed from the groove 41 of the preceding upstream rotating disc 4s to the groove 41 of the following downstream rotating disc 4t. This ensures the stability in passing the rectangular wire 2 from the groove 41 of the preceding upstream rotating disc 4s to the groove 41 of the following downstream rotating disc 4t.

Other Embodiments

While the present invention has been disclosed in terms of the preferred embodiments in order to facilitate better understanding thereof, it should be appreciated that the invention can be embodied in various ways without departing from the principle of the invention. The above embodiments are not completely unrelated to each other and may be combined unless otherwise impossible. The components constituting each embodiment are not necessarily essential unless otherwise specified or considered to be essential in principle. The number of the components in the embodiments, numerical values, quantities, or ranges referred to in the embodiments are not limited to specified values unless otherwise specified or clearly considered to be essential in principle. The above described configurations of or positional relations between the components are not necessarily limited to those referred to in the embodiments unless otherwise specified or clearly considered to be essential in principle.

The above embodiments may be modified in the following way.

1) The rectangular wires 2 carried by the conveyer 1 are described in the embodiments as being used in a coil of an electrical rotating machine, but may alternatively be used in a coil for various types of electrical devices, such as electrical transformers or electrical power supplies.
2) The rectangular wires 2 used in the embodiments are shaped to have a rectangular cross section, but however, the conveyer 1 may alternatively be designed to carry wires which are shaped to have a plurality of flat surfaces extending in a length thereof, e.g., polygonal in cross section or shaped to have a combination of flat and circular or round surfaces extending in the length thereof.
3) In each of the embodiments, the shafts 8 and the rotating discs 4 are formed by members discrete from each other, but they may alternatively be made integrally of a one-piece member. The rotating discs 4 may be secured directly to the mounting base 3 to be rotatable without use of the shafts 8.
4) In the second embodiment, the rotating discs 4 are designed to have the grooves 41 which are broken down into three types, but however, may alternatively be made up of more than three types of grooves 41.
5) In the fifth embodiment, each of the clamp levers 70 is designed to press the rectangular wire 2 against a first inner surface that is one of the inner surfaces of the groove 41 of the rotating disc 4 in which that rectangular wire 2 is received. The first inner surface faces in the direction in which the rotating disc 4 rotates. The clamp lever 70 may alternatively be engineered to press the rectangular wire 2 against a second inner surface that is one of the inner surfaces of the groove 41 in which that rectangular wire 2 is disposed. The second inner surface faces away from the direction in which the rotating disc 4 rotates. In such a case, the rectangular wire 2 is firmly held or clamped by the pawl 71 of the clamp lever 70 and the second inner surface of the groove 41 of the rotating disc 4. The unclamping lever 91 of the release device 9 is moved by the drive mechanism 92 is configured to press the clamp lever 70 in a direction opposite the direction in which the rotating disc 4 rotates.

What is claimed is:

1. A conveyer which conveys rectangular wires comprising:
    a mounting base;
    a plurality of rotating discs each of which is rotatable about a rotating axis thereof relative to the mounting base, each of the rotating discs having formed in an outer periphery thereof grooves in which the rectangular wire is receivable; and
    a drive unit which works to rotate each of the rotating discs about the rotating axis, wherein
    the rotating discs includes a preceding upstream rotating disc and a following downstream rotating disc which are arranged to partially overlap each other in an axial direction thereof,
    the preceding upstream rotating disc and the following downstream rotating disc are arranged to have a supplying groove that is one of the grooves of the preceding upstream rotating disc overlap with a receiving groove that is one of the grooves of the following downstream rotating disc in the axial direction to pass the rectangular wire from the supplying groove of the preceding upstream rotating disc to the receiving groove of the following downstream rotating disc when the preceding upstream rotating disc and the following downstream rotating disc are located at a given angular position relative to each other, and
    when the rectangular wire is passed from the supplying groove of the preceding upstream rotating disc to the receiving groove of the following downstream rotating disc, the rectangular wire has four side surfaces retained by a combination of the supplying groove of the preceding upstream rotating disc and the receiving groove of the following downstream rotating disc.

2. The conveyer as set forth in claim 1, wherein when the rectangular wire is required to be carried, the drive unit locates the receiving groove of the following downstream rotating disc at a delivery position where the rectangular wire is to be passed from the supplying groove of the preceding upstream rotating disc to the receiving groove of the following downstream rotating disc, rotates the preceding upstream rotating disc until the supplying groove coincides with the receiving groove of the following downstream rotating disc in the axial direction, and then rotates the following downstream rotating disc to pass the rectangular wire from the supplying groove of the preceding upstream rotating disc to the receiving groove of the following downstream rotating disc.

3. The conveyer as set forth in claim 1, wherein the rotating discs include an upstream rotating disc, a middle rotating disc, and a downstream rotating disc which are arranged in this order from an upstream to a downstream side of a conveying path for the rectangular wire, and
    the middle rotating disc is rotated 90° around an axis thereof from a delivery position where the rectangular wire is to be passed from the groove of the upstream rotating disc to the groove of the middle rotating disc to a delivery position where the rectangular wire is to be passed from the groove of the middle rotating disc to the groove of the downstream rotating disc.

4. The conveyer as set forth in claim 1, wherein each of the rotating discs has a plurality of types of grooves which are contoured to conform with the rectangular wires which are different in shape or size of a cross section from each other, and the preceding upstream rotating disc and the following downstream rotating disc are arranged in a given angular relation to each other to have the same type of grooves coincide with each other when the rectangular wire is passed from the preceding upstream rotating disc to the following downstream rotating disc.

5. The conveyer as set forth in claim 1, further comprising conveyer covers which are arranged to cover outer edges of the rotating discs, respectively, and serve to hold the rectangular wires from being removed from the grooves of the rotating discs.

6. The conveyer as set forth in claim 5, further comprising delivery covers each of which is arranged to cover a place where the rectangular wire is passed from the groove of the preceding upstream rotating disc to the groove of the following downstream rotating disc and around the place, and wherein the delivery covers are located closer to the outer edges of the rotating discs than the conveyer covers are.

7. The conveyer as set forth in claim 1, further comprising machining units, stoppers, and presses, the machining units being located each for one of the rotating discs and each working to machine at least one of surfaces of a corresponding one of the rectangular wires, each of the stoppers being contactable with a first end of a length of a corresponding one of the rectangular wires, each of the presses working to press a second end of the length of a corresponding one of the rectangular wires toward the stopper.

8. The conveyer as set forth in claim 1, further comprising clamp levers and release devices, each of the clamp lever being arranged to be rotatable together with a respective one of the rotating discs and pressing a corresponding one of the rectangular wires against a first inner surface that is one of inner surfaces of the groove of the one of the rotating discs, the first inner surface facing a rotating direction of the rotating discs or facing away from the rotating direction, and wherein each of the release devices works to release pressing the rectangular wire, as achieved by the clamp lever, when the rectangular wire is passed from the groove of the preceding upstream rotating disc to the groove of the following downstream rotating disc.

* * * * *